United States Patent
Sikora et al.

(10) Patent No.: US 7,148,814 B2
(45) Date of Patent: Dec. 12, 2006

(54) METHODS AND SYSTEMS FOR DISPLAYING AIRCRAFT ENGINE CHARACTERISTICS

(75) Inventors: Joseph A. Sikora, Seattle, WA (US); John Wiedemann, Seattle, WA (US)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 10/860,760

(22) Filed: Jun. 3, 2004

(65) Prior Publication Data

US 2006/0220914 A1   Oct. 5, 2006

Related U.S. Application Data (60) Provisional application No. 60/476,713, filed on Jun. 6, 2003.

(51) Int. Cl.
  *G08B 23/00* (2006.01)
  *G05B 11/01* (2006.01)
  *G06F 3/00* (2006.01)
  *G06F 9/00* (2006.01)
  *G06F 17/00* (2006.01)

(52) U.S. Cl. .................. 340/945; 340/966; 700/12; 700/17; 715/763

(58) Field of Classification Search ........ 340/945–983, 340/984, 426.15, 426.3, 439, 441; 701/3–18; 700/17; 715/700, 763, 771, 772
See application file for complete search history.

(56) References Cited

U.S. PATENT DOCUMENTS

| | | | |
|---|---|---|---|
| 3,191,147 A | 6/1965 | Majendie | |
| 4,196,474 A | 4/1980 | Buchanan et al. | |
| 4,212,064 A | 7/1980 | Forsythe | |
| 4,247,843 A | 1/1981 | Miller | |
| 4,274,096 A | 6/1981 | Dennison | |
| 4,325,123 A | 4/1982 | Graham | |
| 4,631,678 A | 12/1986 | Angermuller et al. | |
| 4,792,906 A | 12/1988 | King | |
| 4,860,007 A | 8/1989 | Konicke | |
| 5,050,081 A * | 9/1991 | Abbott et al. | ................. 701/14 |
| 5,329,277 A | 7/1994 | Dougan et al. | |

(Continued)

FOREIGN PATENT DOCUMENTS

DE    3315386 A    10/1984

(Continued)

OTHER PUBLICATIONS

777 Flight Deck (1 page) http://www.meriweather.com/777/777_main.html [Accessed Jan. 28, 2003].

(Continued)

*Primary Examiner*—Daniel Wu
*Assistant Examiner*—Jennifer Mehmood
(74) *Attorney, Agent, or Firm*—Perkins Coie LLP (57) ABSTRACT

A method and system for displaying aircraft engine information. In one embodiment, the method includes directing the display of an icon that represents an overall operational state of an aircraft engine, with the overall operational state including one of a started state and an unstarted state. The method can further include directing a change in a displayed characteristic of the icon when the overall operational state of the aircraft engine changes from the one of the started state and the unstarted state to the other of the started state and the unstarted state. In a further embodiment, the method can further include repeatedly directing changes in the display of the icon as the aircraft changes from the unstarted state to the started state.

41 Claims, 8 Drawing Sheets

U.S. PATENT DOCUMENTS

| | | | |
|---|---|---|---|
| 5,337,982 A | 8/1994 | Sherry | |
| 5,420,582 A | 5/1995 | Kubbat | |
| 5,454,074 A | 9/1995 | Hartel | |
| 5,499,025 A | 3/1996 | Middleton et al. | |
| 5,668,542 A * | 9/1997 | Wright | 340/971 |
| 5,715,163 A | 2/1998 | Bang | |
| 5,739,769 A | 4/1998 | Vladimir | |
| 5,844,503 A | 12/1998 | Riley et al. | |
| 5,875,998 A | 3/1999 | Gleine | |
| 5,940,013 A * | 8/1999 | Vladimir et al. | 340/945 |
| 5,978,715 A | 11/1999 | Briffe | |
| 6,057,786 A | 5/2000 | Briffe | |
| 6,085,129 A | 7/2000 | Schardt | |
| 6,098,014 A | 8/2000 | Kranz | |
| 6,112,141 A | 8/2000 | Briffe | |
| 6,118,385 A | 9/2000 | Leard | |
| 6,188,937 B1 | 2/2001 | Sherry | |
| 6,246,320 B1 | 6/2001 | Monroe | |
| 6,262,720 B1 | 7/2001 | Jeffrey | |
| 6,278,913 B1 | 8/2001 | Jiang | |
| 6,314,366 B1 | 11/2001 | Farmakis et al. | |
| 6,346,892 B1 * | 2/2002 | DeMers et al. | 340/945 |
| 6,362,750 B1 | 3/2002 | Castor | |
| 6,381,519 B1 | 4/2002 | Snyder | |
| 6,389,333 B1 | 5/2002 | Hansman | |
| 6,443,399 B1 | 9/2002 | Yount et al. | |
| 6,542,796 B1 | 4/2003 | Gibbs et al. | |
| 6,556,902 B1 | 4/2003 | Ing | |
| 6,636,786 B1 * | 10/2003 | Partel | 701/3 |
| 6,697,718 B1 * | 2/2004 | Le Draoullec et al. | 701/29 |
| 6,720,891 B1 | 4/2004 | Chen et al. | |
| 6,745,113 B1 | 6/2004 | Griffin, III et al. | |
| 6,753,891 B1 | 6/2004 | Chohan et al. | |
| 2002/0016654 A1 * | 2/2002 | Ing et al. | 701/29 |
| 2002/0033837 A1 | 3/2002 | Munro | |
| 2003/0058134 A1 | 3/2003 | Sherry | |
| 2003/0132860 A1 | 7/2003 | Feyereisen | |
| 2004/0059474 A1 | 3/2004 | Boorman et al. | |
| 2004/0183697 A1 * | 9/2004 | Rogers et al. | 340/971 |
| 2004/0254691 A1 | 12/2004 | Subelet | |
| 2006/0004496 A1 | 1/2006 | Tucker et al. | |

FOREIGN PATENT DOCUMENTS

| | | |
|---|---|---|
| EP | 0 370 640 | 5/1990 |
| EP | 0 489 521 | 6/1992 |
| EP | 0 286 120 | 10/1998 |
| FR | 2817831 | 6/2002 |
| FR | 2848306 | 5/2004 |
| GB | 886136 | 1/1962 |
| WO | WO-02/24530 | 3/2002 |

OTHER PUBLICATIONS

Hutchins, Edwin, "The Integrated Mode Management Interface," Department of Cognitive Science, University of California, San Diego, Sep. 17, 1996.

Lindenfeld, "What is an FMS?", Flight Management Systems (5 pages) http:://www.ultranet.com/~marzgold/FAQ-FMS.html [Accessed Jun. 3, 2002].

Meriweather's Flight Deck Flight Acronyms & Definitions (4 pages) http://www.meriweather.com/fd/def.html [Accessed Jun. 3, 2002].

Peugeot 406 Handbook, Automobiles Peugeot, Paris, France, May 14, 1998 (pp. 30 and 38).

Presentation by Airbus Industries personnel on Jun. 10, 2002 (12 pgs).

U.S. Appl. No. 10/746,883, Boorman.
U.S. Appl. No. 10/746,912, Boorman.
U.S. Appl. No. 10/787,644, Tafs et al.
U.S. Appl. No. 10/798,588, Griffin, III et al.
U.S. Appl. No. 10/798,749, Sandell et al.
U.S. Appl. No. 10/814,369, Chen et al.
U.S. Appl. No. 10/814,494, Griffin, III et al.
U.S. Appl. No. 10/815,034, Crane et al.
U.S. Appl. No. 10/860,760, Sikora et al.
U.S. Appl. No. 10/881,024, Griffin, III et al.
U.S. Appl. No. 10/882,101, Griffin, III et al.
U.S. Appl. No. 10/882,800, Griffin, III et al.

* cited by examiner

METHODS AND SYSTEMS FOR DISPLAYING AIRCRAFT ENGINE CHARACTERISTICS

CROSS-REFERENCE TO RELATED APPLICATION

The present application claims priority to pending U.S. Provisional Application No. 60/476,713, filed Jun. 6, 2003 and incorporated herein in its entirety by reference.

TECHNICAL FIELD

The present invention relates generally to methods and systems for displaying aircraft engine characteristics, such as the operational state of the engines, to the flight crew of the airplane.

BACKGROUND

Figure 1A:
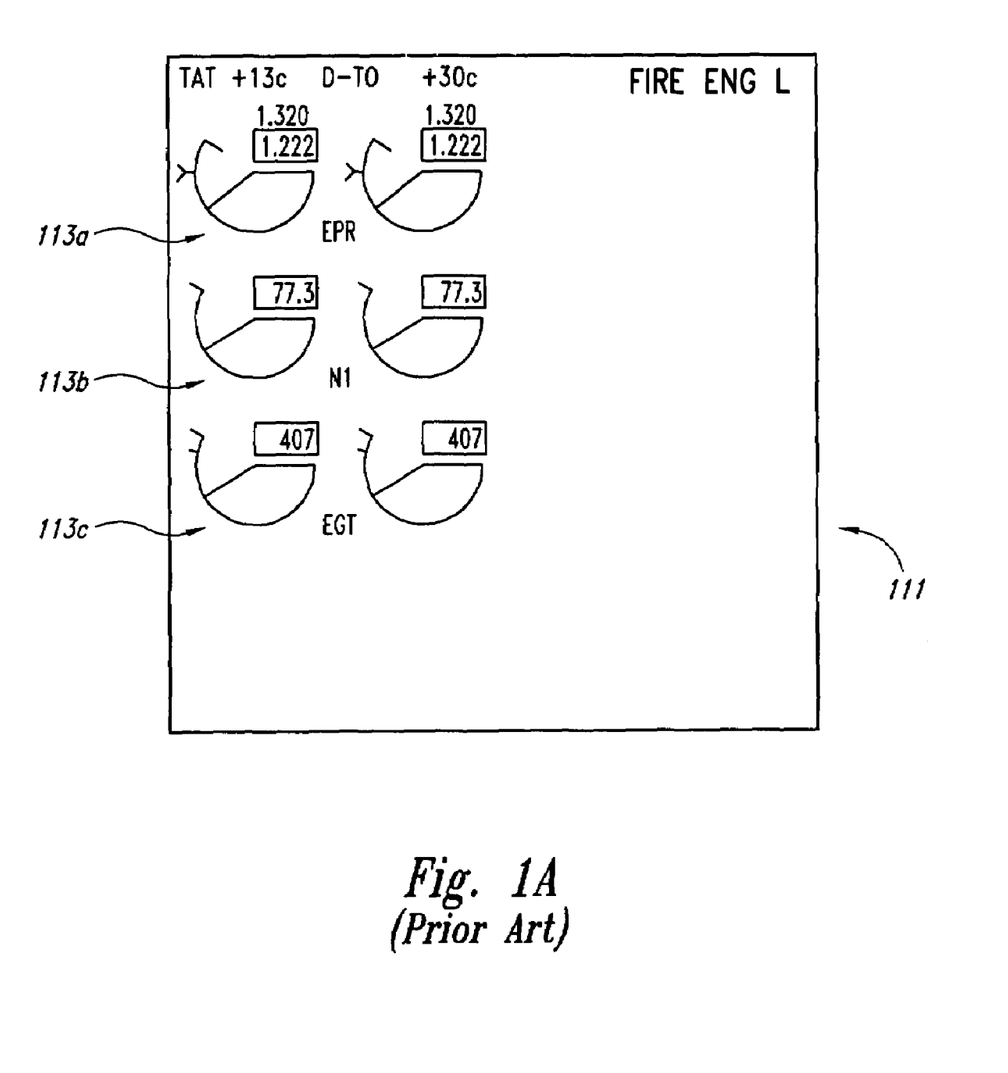
FIGS. 1A–1B illustrate engine flight deck displays in accordance with the prior art.
Figure 1B:
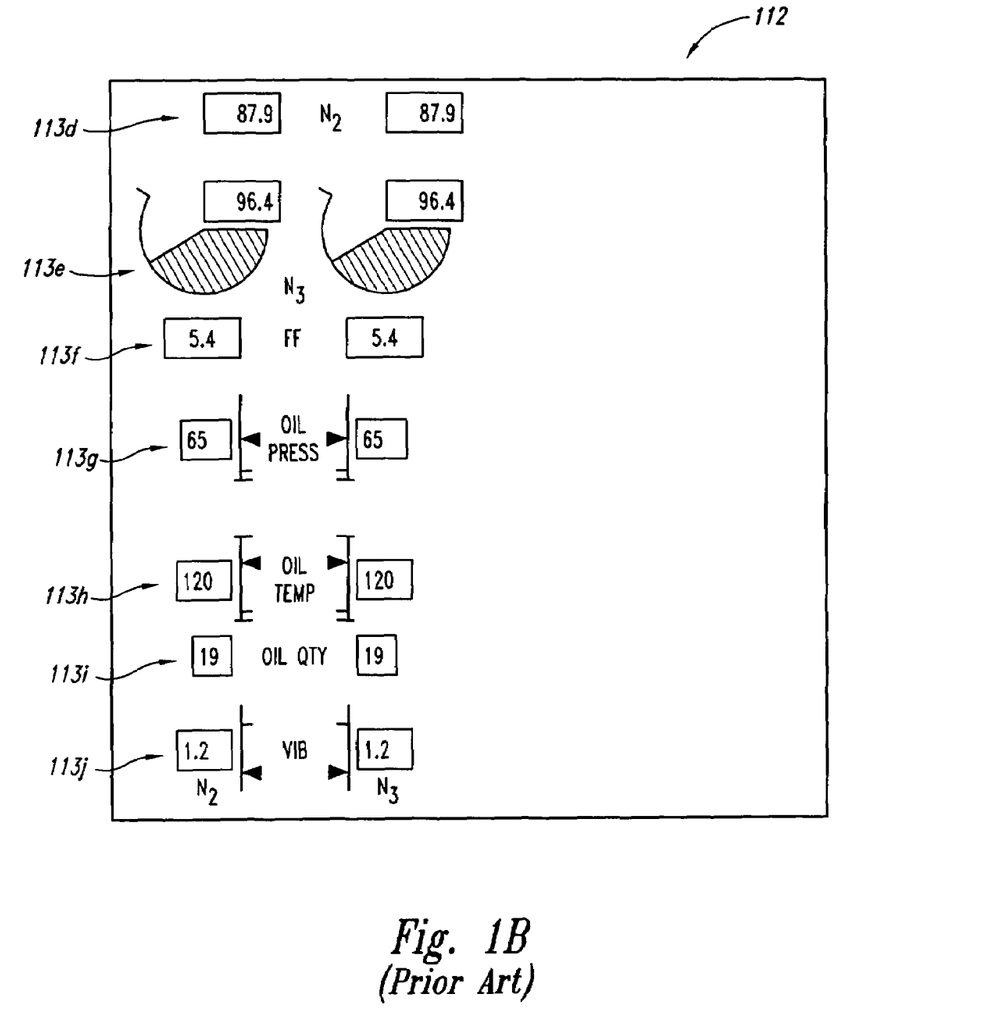

Modern aircraft engine flight deck displays typically include computer-driven display screens dedicated to presenting engine status indications. These display screens typically present to the pilots engine data indicating the values of a variety of engine operating parameters. For example, the display screens present a primary engine display 111 (shown in FIG. 1A) and a secondary engine display 112 (shown in FIG. 1B). The primary engine display 111 presents top-level engine parameter data, such as engine pressure ratio (EPR) at an EPR display 113a, low pressure compressor shaft rotation speed (N1) at an N1 display 113b, and exhaust gas temperature (EGT) at an EGT display 113c. The primary engine display 111 includes multiple sets of displays 113a–c (two are shown in FIG. 1A), one set for each engine of the aircraft.

The secondary engine display 112 includes data corresponding to other engine operating parameters. For example, the secondary engine display 112 shown in FIG. 1B includes intermediate compressor shaft rotation speed (N2) at an N2 display 113d, high pressure compressor shaft rotation speed (N3) at an N3 display 113d, fuel flow at a fuel flow display 113f, oil pressure at an oil pressure display 113g, oil temperature at an oil temperature display 113h, oil quantity at an oil quantity display 113i, and engine vibration at an engine vibration display 113j.

One characteristic associated with the foregoing approaches for displaying engine data is that the pilot or other crew member operating the aircraft must be able to quickly view the data, integrate and interpret the data, and determine whether the data warrant an action on the part of the crew. If an action is required, in many cases, the pilot must determine what the action is. One drawback with this approach is that it can be time-consuming and costly to train pilots to quickly and efficiently carry out the foregoing steps.

One approach to addressing the foregoing problem is to display engine thrust, as well as other engine operating parameters, in a color coded manner that indicates when the thrust or other parameters exceed predetermined limits. One such method is disclosed in U.S. Pat. No. 5,050,081 to Abbott et al. However, this approach may also suffer from some of the foregoing drawbacks, namely, that presenting pilots with a plurality of parameter data still requires them to integrate and interpret the data. For example, the pilot may not be able to readily determine whether the aircraft engines are started or not, or whether the engines are in a start mode with the start progressing. This situation can arise during in-flight engine restarts. Also it may still be time-consuming to train pilots to understand the information presented to them, and it may take time to train the pilots to understand what action is required based on the data they see.

SUMMARY

The present invention is directed toward computer-implemented methods and systems for displaying aircraft information. In one aspect of the invention, a method includes directing the display of an icon that represents an overall operational state of an aircraft engine, with the overall operational state including one of a started state and an unstarted state. The method can further include directing a change in a displayed characteristic of the icon when the overall operational state of the aircraft engine changes from the one state to the other state. For example, the method can include displaying an icon having a shape representative of an aircraft engine having an inlet, and can further include displaying a fan in an inlet portion of the icon to indicate when the engine is in the started state.

In another aspect of the invention, the method can include repeatedly changing a displayed characteristic of the icon as the engine changes from the unstarted state to the started state. For example, the method can include increasing an amount of a display field having a selected characteristic (e.g., color) as the aircraft engine changes from the unstarted state to the started state. In further aspects of the invention computer systems, computer-readable media and/or data structures can carry out some or all of the foregoing functions.

DETAILED DESCRIPTION

The present disclosure describes methods and systems for displaying aircraft engine characteristics. Many specific details of certain embodiments of the invention are set forth in the following description and in FIGS. 2–8 to provide a thorough understanding of these embodiments. One skilled in the art, however, will understand that the present invention may have additional embodiments, and that the invention may be practiced without several of the details described below.

Many embodiments of the invention described below may take the form of computer-executable instructions, such as routines executed by a programmable computer. Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, hand-held devices (including palm-top computers, wearable computers, cellular or mobile phones, multiprocessor systems, processor-based or programmable consumer electronics, mini-computers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable computer disks (e.g., removable disks), as well as distributed electronically over networks. Data structures and transmissions of data particular to aspects of the invention are also encompassed within the scope of the invention. Information handled in accordance with aspects of the invention can be presented at displays or display media, for example, CRT screens, LCD screens or other suitable devices.

Figure 2:
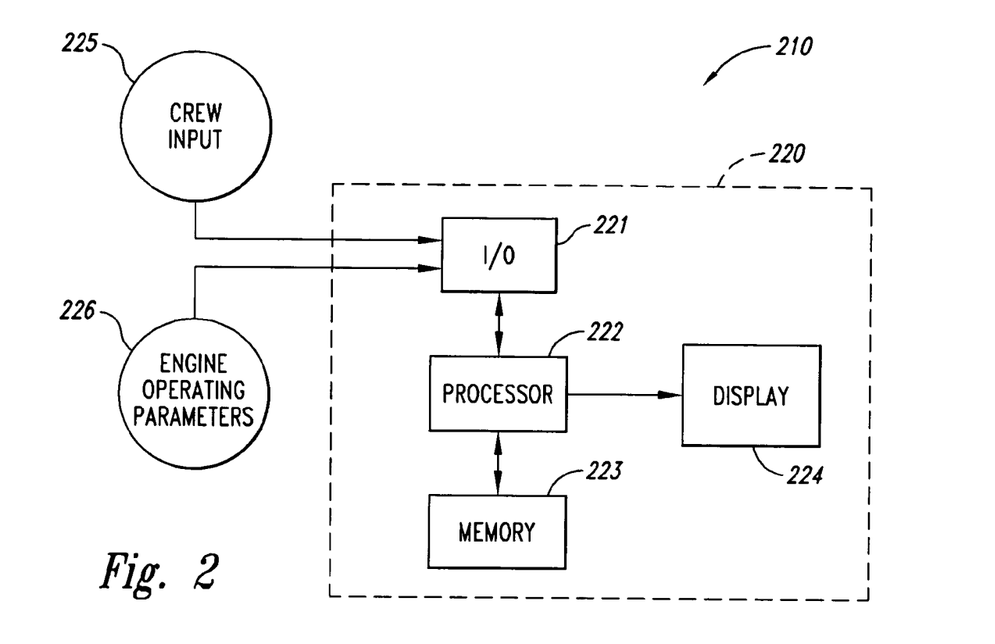
FIG. 2 is a schematic illustration of a system for displaying aircraft engine characteristics in accordance with an embodiment of the invention.

FIG. 2 is a schematic block diagram illustrating a system 210 that displays the state of one or more aircraft engines in accordance with an embodiment of the invention. In one aspect of this embodiment, the system 210 can include a computer 220 having one or more input/output devices 221, a processor 222, a memory 223, and a display unit 224. In other embodiments, the functions carried out by the system 210 can be distributed over a plurality of computers or processing platforms. In any of these embodiments, the input/output devices 221 can receive signals corresponding to engine operating parameter signals 226, and, optionally, crew input signals 225. The processor 222 can determine the overall operational state of each engine, based at least in part on one or more of the engine operating parameter signals 226. The processor 222 can then direct the display of an icon at the display unit 224 that qualitatively indicates the overall operational state of the engine and, optionally, a visual cue that indicates to the pilot (a) whether an action is required and if so, (b) what the action should be.

In one embodiment, the computer 220 can be generally similar to existing avionics computers, but can be programmed and/or configured to carry out the foregoing processes. For example, the computer 220 can include an engine controller computer (EEC or FADEC) and/or an aircraft display computer. In any of these embodiments, one or more of the input/output devices 221 can be configured to receive the engine operating parameter signals 226 directly from the aircraft engines and/or from intermediate computers or processors. One or more of the input/output devices 221 can be configured to receive the crew input signals 225 and can accordingly include a keypad, mouse pad, touch screen, or other such device. The crew input signals 225 can be used to tailor certain aspects of the manner in which information is presented at the display 224, or obtain additional information, without affecting the content of the information. One or more of the input/output devices 221 can also be configured to access a computer-readable medium (such as a CD or diskette). Directions for carrying out processes in accordance with embodiments of the invention can be stored on such media, and/or in the memory 223.

Figure 3:
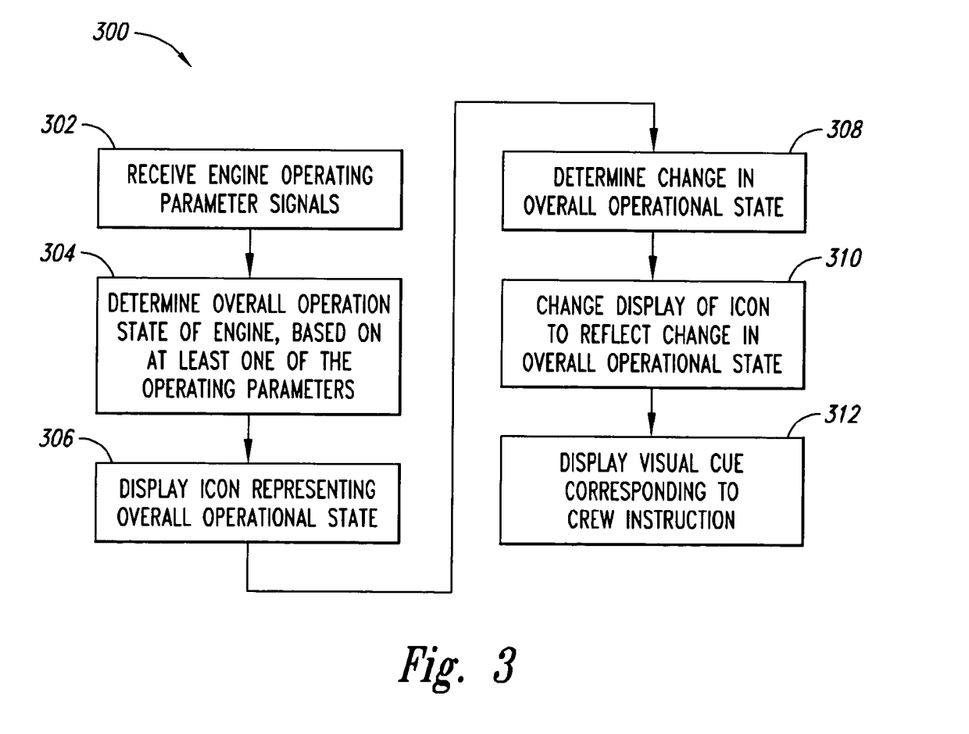
FIG. 3 is a flow diagram illustrating a process for displaying aircraft engine characteristics in accordance with an embodiment of the invention.

FIG. 3 is a flow diagram illustrating a process 300 for presenting aircraft engine information to the crew. The process 300 includes receiving engine operating parameter signals (process portion 302). The overall operational state of the engine is then determined, based on at least one of the operating parameters (process portion 304). In one embodiment, the overall operational state of the engine can be selected from one or more pre-established states. For example, the pre-established states can include states for which (a) the engine is shut down, (b) the engine is operating normally, (c) the engine is running and is operating with a malfunction or condition that requires the pilot to reduce the engine power level, and (d) the engine is running and operating with a malfunction or condition that requires the pilot to shut the engine down. In other embodiments, the pre-established states can include a state in which the engine is starting up, a state in which the engine has been shut down normally and is available for restart, and/or a state in which the engine has been shut down in an emergency procedure and/or is unavailable for restart.

In process portion 306, an icon is displayed representing the overall operational state of the engine. The process 300 can further include determining a change in the overall operational state (process portion 308) and changing the display of the icon to reflect changes in the overall operational state (process portion 310). The process 300 can further include displaying one or more visual cues corresponding to a pilot instruction that is based on the operational state of the engine (process portion 312). Further details of the content and manner in which the engine-related information is displayed are provided below with reference to FIGS. 4 and 5.

Figure 4:
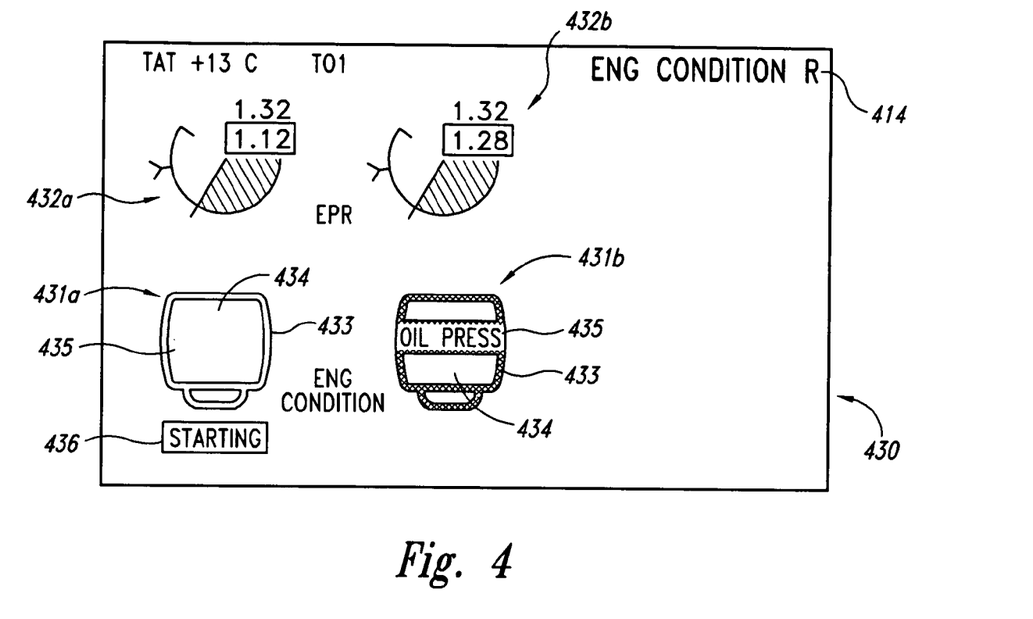
FIG. 4 illustrates a display for presenting aircraft engine states and pilot instruction cues in accordance with an embodiment of the invention.

FIG. 4 illustrates a display 430 suitable for presentation on the display device 224 (FIG. 2) in accordance with an embodiment of the invention. In one aspect of this embodiment, the display 430 presents one or more icons 431 (two are shown in FIG. 4 as a first or left icon 431a and a second or right icon 431b). In one embodiment, each icon 431 can include an outline 433 having a shape that is roughly representative of an aircraft engine. In other embodiments, the icons 431 can have other shapes, such as those described below with reference to FIG. 5. In any of these embodiments, each icon 431 represents a qualitative, overall operational state of the corresponding aircraft engine, such as the states described above with reference to FIG. 3. The overall operational state is a level of interpretation beyond engine operating parameters (such as N1, EPR, or EGT) and quantities calculated from the engine operating parameters (such as engine thrust).

In another aspect of an embodiment shown in FIG. 4, a characteristic of the icon 431 can indicate the present state of the aircraft engine and can change to indicate a change in state of the aircraft engine while the overall size of the icon 431 and its position on the display 430 remains constant. For example, in one embodiment, the color of the outline 433 can represent the present state of the aircraft engine, and can change as the state of the aircraft engine changes. In one aspect of this embodiment, the outline 433 can be white when the aircraft engine is not running. If the aircraft engine is operating normally, the outline 433 can shift to green.

The characteristic of the icon 431 can indicate not only the state of the aircraft but whether the engine requires pilot or other crew intervention, and if so, what that intervention should be. For example, if the aircraft engine is operating with a condition or malfunction that requires the thrust of the engine to be reduced, the color of the outline 433 can be amber. If the aircraft engine is operating at a condition or with a malfunction that warrants or requires the engine to be shut down, the color of the outline 433 can be red. In other embodiments, other colors can indicate these or other overall engine states. In any of these embodiments, the color of the outline 433 not only indicates the state of the aircraft engine, but also provides a clear visual cue to the operator as to what type of action is required as a result of the engine state.

In other embodiments, other characteristics of the icon 431 can change as the overall operational state of the aircraft engine changes. For example, in one embodiment, the line thickness of the outline 433 can change in addition to or in lieu of changing the color of the outline 433. In another embodiment, an internal region 434 defined by the outline 433 can change in color, shading or other easily viewed aspects again, in addition to or in lieu of changing the color of the outline 433. In other embodiments, other characteristics of the icon 431 can change to indicate the change in state.

In still further embodiments, the display 430 can include information in addition to that described above. For example, the icons 431 can include an operating parameter display 435 that is blank when the engine is shut down, starting, or operating normally (as indicated by icon 431a). When the engine is not operating normally, the operating parameter display 435 can indicate the one or more engine operating parameters that precipitated the need for operator intervention. For example, (as shown in FIG. 4), the second icon 431b has an operating parameter display 435 that presents the text "OIL PRESS", which indicates that an oil pressure reading outside a selected range precipitated the change in color of the icon 431b to amber or red. In one embodiment, the determination to present the icon 431 with a particular characteristic can be based upon all the evaluated engine operating parameters being within corresponding selected ranges (for example, when the engine is operating normally), or any one of the engine operating parameters being outside the corresponding selected range (for example, if the engine power is to be reduced or halted). In another embodiment, this determination can require more than one engine operating parameter to be out of range.

In one embodiment, the corresponding range can refer to a range of values for a single engine operating parameter (e.g., EGT); in other embodiments, the corresponding range can refer to a rate of change of an engine operating parameter, a relationship (such as a ratio) of one engine operating parameter to another, or other algorithms that operate on one or more engine operating parameters. These algorithms can be used to detect engine operating conditions, such as an engine surge condition, which can be based on, among other parameters, combuster burner pressure. In any of these embodiments, if more than one engine operating parameter or condition dictates the characteristic with which the icon 431 is displayed, all such engine operating parameters or conditions can be displayed at the operating display 435. Alternatively, less than all the out-of-range engine operating parameters can be displayed at the operating display 435.

The display 430 can further include a state indicator text field 436 that indicates, with text, the state of the aircraft engine and/or a characteristic of the state. For example, the state indicator text display 436 can indicate that the corresponding left engine is not yet running (consistent with the white outline 433 of the icon 431a) and furthermore, that the left engine is in the process of starting. In other embodiments, the state indicator text field 436 can describe, in text, other characteristics of the overall operational state of the aircraft engine.

The display 430 can also include thrust indicators 432, such as EPR (shown as a first or left thrust indicator 432a and a second or right thrust indicator 423b). The thrust indicators 432 can graphically depict the thrust level produced by the corresponding engine, (and/or an engine operating parameter representative of thrust), along with a numerical representation of the thrust level, and an indicator of any limits associated with the thrust level. The display 430 can also include an alert 414 (such as an EICAS alert on Boeing models) that presents a textual message for the pilot providing further details of a condition that may warrant or require operator action.

One feature of an embodiment of the system 210 described above with reference to FIGS. 2–4 is that the icon 431 presents to the pilot or other operator a qualitative, high-level, positive indication of the operational state of the aircraft engine or engines. An advantage of this feature is that the pilot need not integrate and interpret a variety of engine parameters to determine the operational state of the engine, but can instead understand with only a glance what the operational state of the engine is. For example, the pilot can tell at a glance that a particular engine is operating normally or abnormally without checking to see that each of a variety of engine parameters are within normal limits.

Another feature of an embodiment of the system 210 described above with reference to FIGS. 2–4 is that the overall operational state of the corresponding aircraft engine can be determined on the basis of a plurality of engine operating parameters. An advantage of this feature is that the determination of the state can be less likely to be incorrect because it includes an evaluation and/or synthesis of several engine parameters. For example, an indication that the engine is operating normally can be based on a determination that all the engine operating parameters are within an acceptable range of values and a determination that the engine is operating improperly can be based on a determination that any one of the operating parameters is outside the relevant acceptable range of values.

Still another feature of an embodiment of the system 210 described above with reference to FIGS. 2–4 is that one or more characteristics of the icon 431 can change as the overall operational state of the corresponding aircraft engine changes. The change in the characteristic of the icon 431 provides a clear visual cue to the pilot that the operational state of the engine has changed. Accordingly, the pilot need not look at, integrate and interpret one or more displays to determine when the display indicates a change in state, but can instead tell immediately by glancing at the display 430 that the state of the aircraft engine has changed.

Yet another feature of an embodiment of the system 210 described above with reference to FIGS. 2–4 is that for at least some operational states, the characteristic of the icon 431 can correspond directly to recommended and/or necessary pilot actions. Accordingly, the pilot need not recall the specific action required by the engine's state, or refer to a manual to determine what to do in response to the engine state, but can instead recognize immediately upon viewing the display 430 what action is required. For example, if the icon 431 is displayed in amber, the pilot can immediately recognize that power to the corresponding engine should be reduced, regardless of which engine operating parameter(s) triggered the indication. If after reducing power, the icon 431 turns green, the pilot can immediately recognize that the corresponding engine is now operating within normal limits. If despite one or more power reductions, the icon turns red, the pilot can immediately recognize that the corresponding engine should be shut down, again, regardless of which engine operating parameter(s) triggered the indication.

Of course, if the pilot wishes to obtain further information about specific engine operating parameters, he or she can receive the information either from the display 430, e.g. via the operating parameter display 435, or via other conventional displays, such as a secondary engine display. In other embodiments, the pilot can query the computer 220 (FIG. 2) with an input signal 225 (FIG. 2) to obtain further information. For example, the pilot can align a cursor with the icon 431 and click a mouse key, or select some other input key to obtain parameter data for the corresponding engine.

Figure 5:
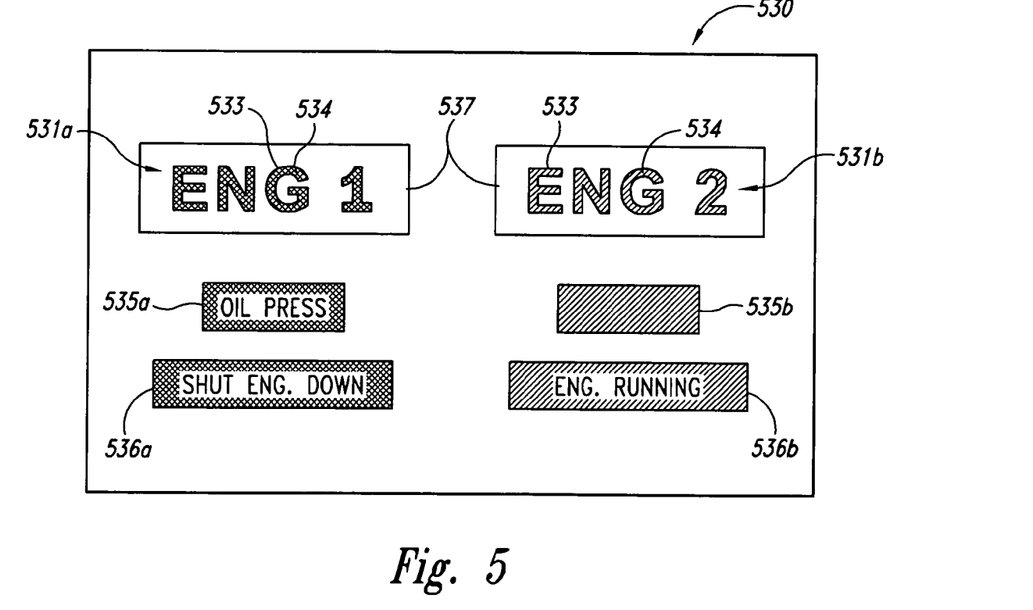
FIG. 5 illustrates a display for presenting aircraft engine states and pilot instruction cues in accordance with another embodiment of the invention.

FIG. 5 is a partially schematic illustration of a display 530 configured in accordance with another embodiment of the invention. In one aspect of this embodiment, the display 530 includes two icons 531 (shown as a first or left icon 531a and a second or right icon 531b) that indicate the overall operational state of the corresponding aircraft engines. In a further aspect of this embodiment, the icons 531 have the form of text characters. In other embodiments, the icons 531 can have other shapes and/or formats. In any of these embodiments, characteristics of the icons 531 can indicate the state of the corresponding aircraft engine and can change when the state of the corresponding aircraft engine changes. For example, each icon 531 can have an outline 533 that changes in color, thickness, and/or intensity. In another embodiment, each icon 531 can include an interior region 534 that changes color when the state of the corresponding aircraft engine changes. In still another embodiment, each icon can be presented against a background field 537, and the background field can change in color or another characteristic as the state of the corresponding engine changes.

The display 530 can further include additional information regarding details of the aircraft engine operation. For example, the display 530 can include operating parameter displays 535 (shown in FIG. 5 as operating parameter displays 535a and 535b) that indicate which engine operating parameter, if any, precipitated the overall operational state indicated by the icon 531. The display 530 can further include state indicator text fields 536 (shown as fields 536a and 536b) for each icon 531 which indicate, via text, further details of the corresponding engine state. For example, if the state of the engine represented by the first icon 531a is such that the pilot should shut the engine down, the text field 536a can include a message indicating that the pilot should shut the engine down. This message, along with the operating parameter display 535a and the icon 531a can all share the same visual characteristic. For example, if the icon 531a is displayed in red, the corresponding operating parameter display 535a and state indicator text field 536a can also be displayed in red. If the corresponding engine is operating normally (for example, as indicated by the second icon 531b) the corresponding operating parameter display 535b can be blank, and the corresponding state indicator text field 536b can indicate that the engine is running. The second icon 531b and the corresponding operating parameter display 535b and state indicator text field 536b can all share the same characteristic, such as a green display color.

In other embodiments, the characteristics of the icons 531a and/or the operating parameter displays 535 and/or the state indicator text fields 536 can have other characteristics that reflect the current overall operational state of the corresponding engine, and provide an indicator for pilot action, if such is required. For example, in one embodiment, the icon 531a and associated display fields can be constantly illuminated when the engines are shut down or running normally. These fields can blink at a relatively slow rate when the pilot is required to reduce power to the corresponding engine, and can blink at a more rapid rate when the pilot is required to shut the engine down. These characteristics of the icon and associated display elements can be employed in addition to or in lieu of the color change characteristic described above. In other embodiments, other characteristics of the icon and associated display fields can reflect the current state of the corresponding engine and any action required by the pilot based on the current state.

Figure 6A:
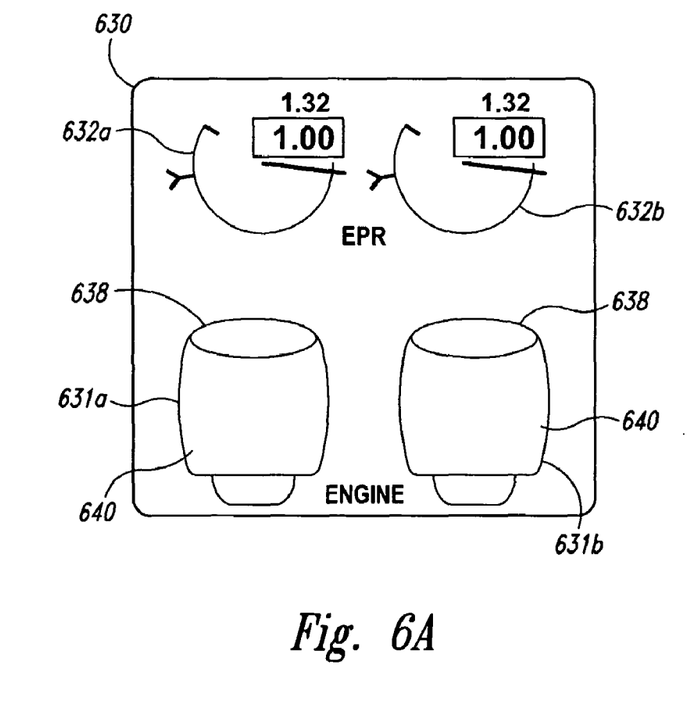
FIGS. 6A–6D illustrate displays for presenting aircraft engine states and pilot instruction cues during engine start-up, in accordance with an embodiment of the invention.

FIGS. 6A–6D illustrate a display 630 presenting engine state information in accordance with another embodiment of the invention. Referring first to FIG. 6A, the display 630 can present icons 631 for each aircraft engine (two are shown in FIG. 6A as a first icon 631a and a second icon 631b), along with corresponding thrust indicators 632 (shown as a first thrust indicator 632a and a second thrust indicator 632b). The thrust indicators 632 can correspond to thrust levels, directly (e.g., via EPR values), or indirectly. Each icon 631 can include a run field 638 that indicates whether or not the engine is running, for example, whether or not the engine is operating at or above idle conditions. In an embodiment shown in FIG. 6A, the run field 638 can include a graphical depiction of the engine inlet. In other embodiments, the run field 638 can have other shapes and/or can represent other portions or aspects of the engine. Each icon 631 can also include a graphical start field 640 (e.g., at the interior of the icon 631) which is shown empty in FIG. 6A. Because the graphical start fields 640 are shown empty and because the run fields 638 are also empty, the pilot or other operator has a clear indication that the engines are not running.

Figure 6B:
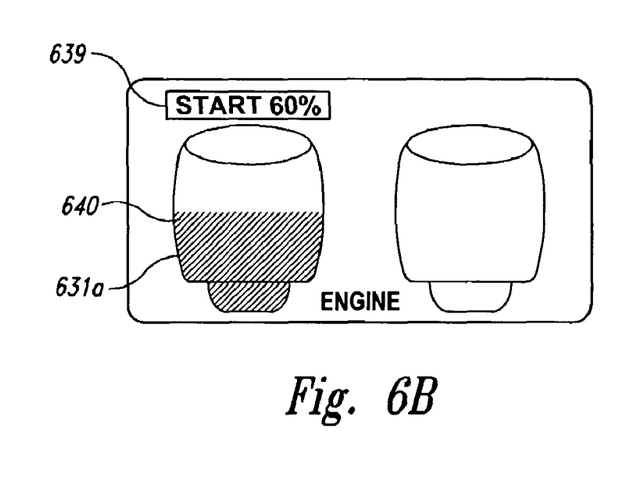
Figure 6C:
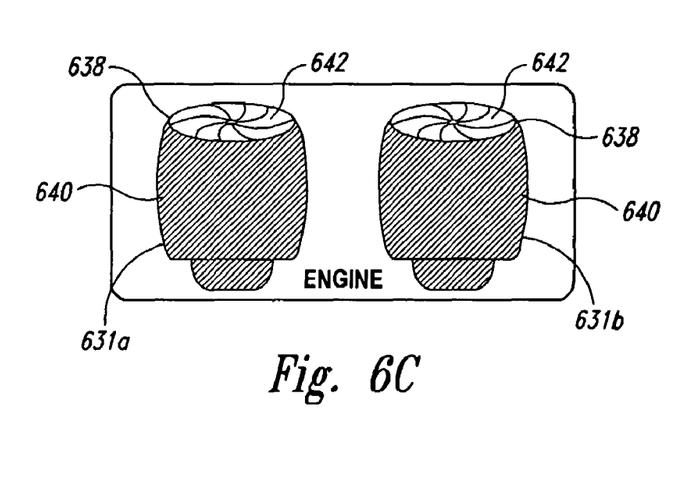

FIG. 6B illustrates the icon 631a during an engine start. As the engine starts, at least one characteristic of the graphical start field 640 begins to change. For example, the graphical start field 640 can gradually change color (e.g., by filling in with a new color). The rate at which the graphical start field 640 changes can correspond to the rate at which the engine approaches idle conditions. For example, the fraction of the graphical start field 640 having a selected color (e.g., gray) can correspond to how close the rotational speed of the engine core is to idle conditions. This information can also be presented in an alphanumeric textual format at a textual start field 639, which indicates that the engine core speed is 60% of the speed associated with idle conditions. As the core speed increases, the fraction of the graphical start field 640 having the changed characteristic (e.g., new color) increases, while the percentage value displayed in the textual start field 639 is updated accordingly. Once the characteristic of the entire graphical start field 640 has changed, the textual start field 639 can display "100%" for a brief period of time, and then the textual start field 639 can go blank, as shown in FIG. 6C. As is also shown in FIG. 6C, a fan icon 642 can appear in the run field 638, indicating that the engine is running (at idle conditions or above) and is available for throttle-up.

Figure 6D:
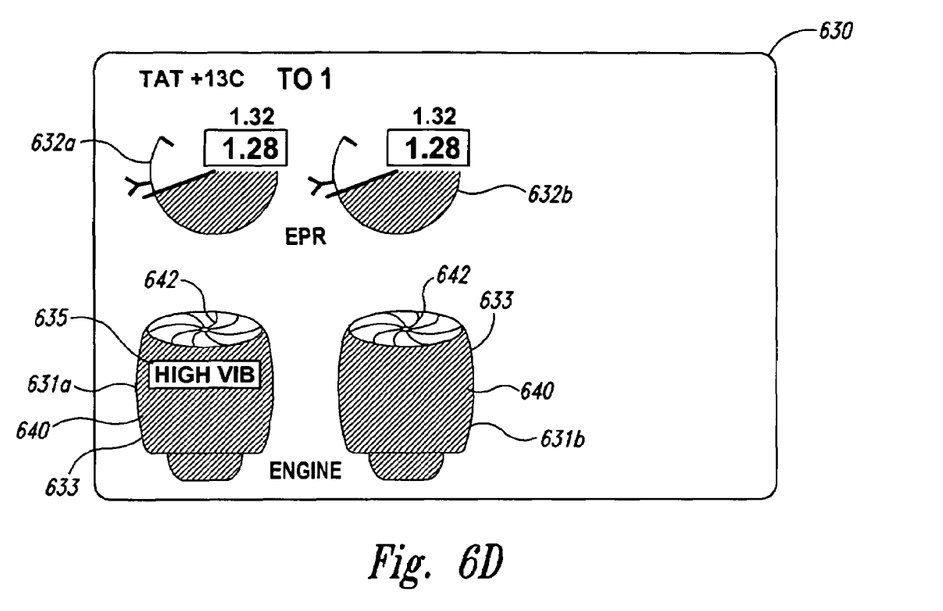

FIG. 6D illustrates the display 630 after the engines have been throttled up. Because the graphical start field 640 is "filled" with the new color and the fan icon 642 appears in the run field 638, the operator can easily recognize that the engines are operating. Because an outline 633 of each icon 631 is displayed as a thin, white line, the operator can also receive an indication that the engines do not require corrective action (e.g., by reducing thrust or shutting down the engines). Nevertheless, the operator may be apprised of engine conditions via a condition message field 635. As shown in FIG. 6D, the condition message field 635 indicates that the left engine has a high vibration condition. Other messages that may appear at the condition message field 635, but which do not require specific engine thrust reduction procedures, or engine shut-down procedures can include low oil quantity, no oil quantity, or a locked rotor.

Figure 7A:
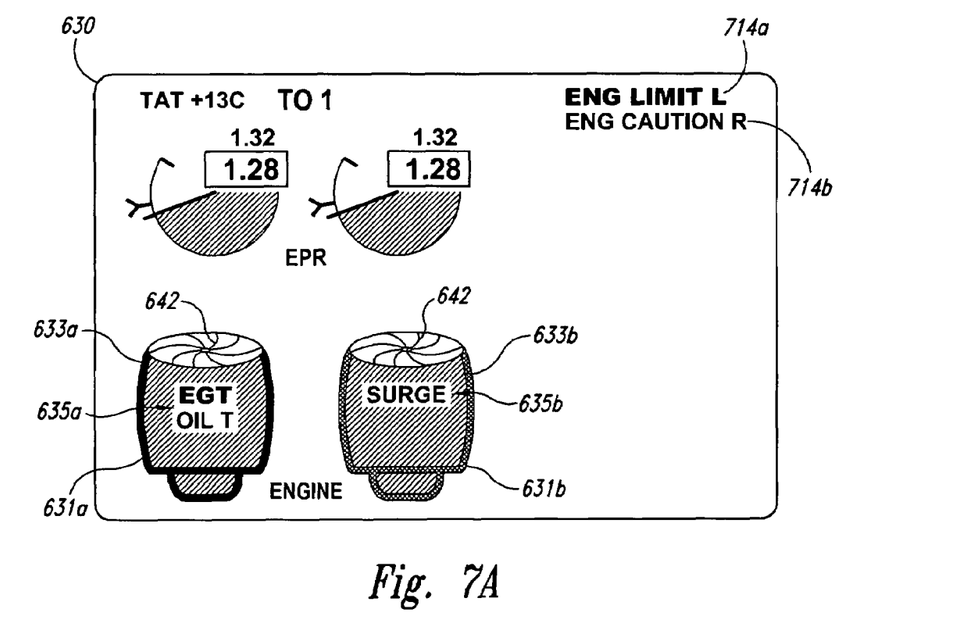
FIGS. 7A–7C illustrate displays for presenting aircraft engine states and pilot instruction cues during non-normal engine operation, in accordance with an embodiment of the invention.
Figure 7B:
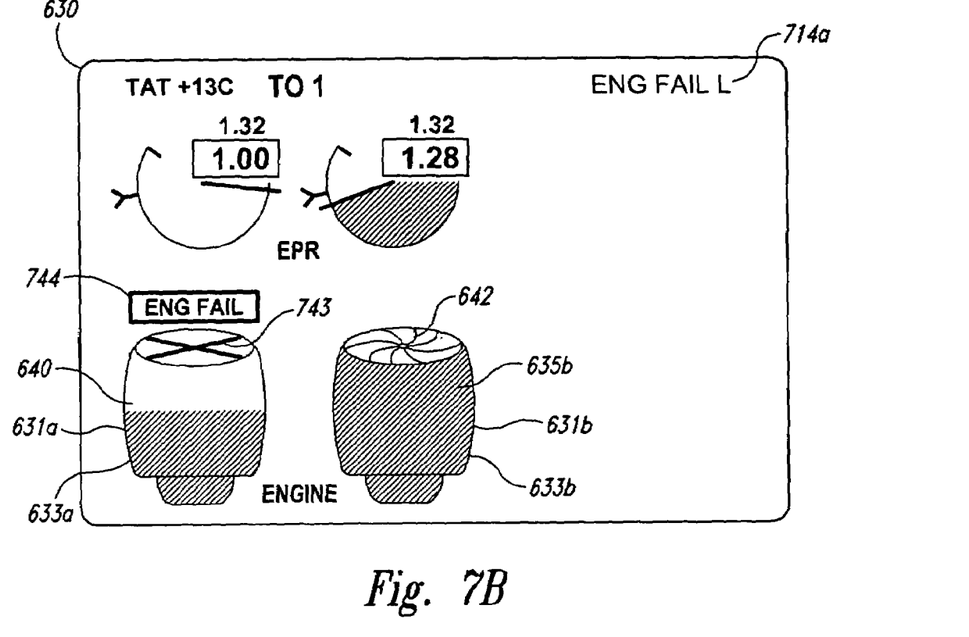
Figure 7C:
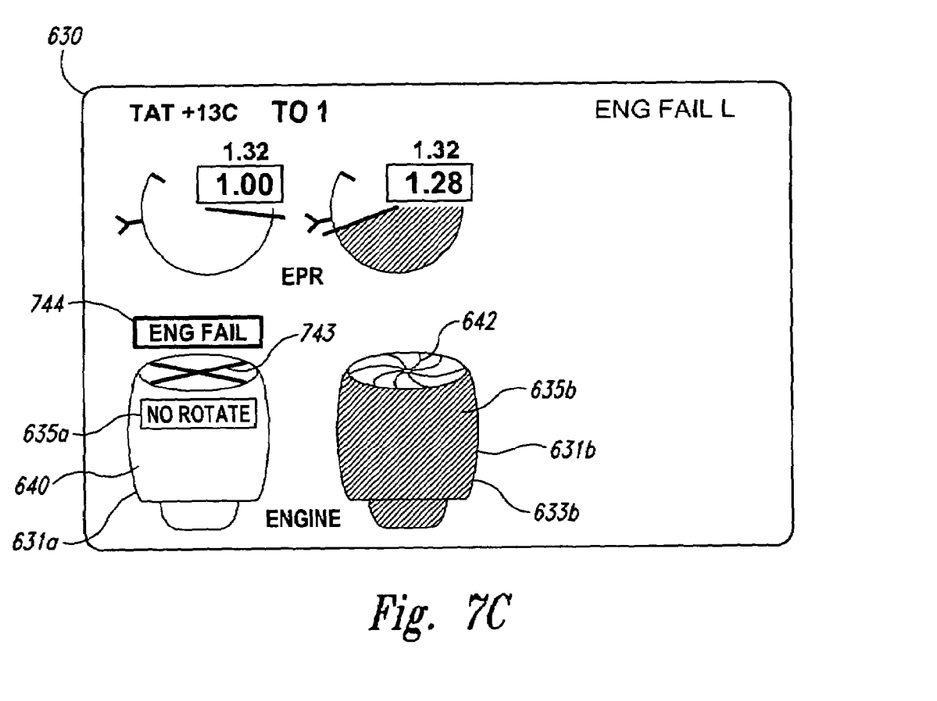

FIGS. 7A–7C illustrate the display 630 presenting information associated with engine conditions that do require the operator to either reduce the engine thrust or shut the engines down. As shown in FIG. 7A, such a condition can be signaled to the operator by an alert message 714 (shown in FIG. 7A as a first alert message 714a corresponding to a first aircraft engine and the first icon 631a, and a second alert message 714b corresponding to a second aircraft engine and the second icon 631b). The visual alert message 714 can be accompanied by an aural alert. The alert message 714 can include an indication of (a) which engine the alert corresponds to (e.g., "L" for left engine and "R" for right engine) and (b) an indication of whether the alert is an engine caution or an engine limit alert. In a particular aspect of this embodiment, an engine caution alert is a directive to the operator to reduce engine thrust, and an engine limit alert is a directive to the operator to shut the engine down. In a further particular aspect of this embodiment, the engine caution alert can be indicated in one color (e.g., amber), and the engine limit alert can be indicated in another color (e.g., red). In other embodiments, other characteristics of the alert messages 714 can be used to distinguish caution alerts from limit alerts.

The presence of an alert condition can also be highlighted by the icons 631a, 631b. For example, the outlines 633a, 633b can be thickened during an alert condition, and can have a color corresponding to the color of the alert messages 714a, 714b. The condition message fields 635 (shown as a first condition message field 635a and a second condition message field 635b) can also be coded to correspond to the color (or other characteristic) of the alert messages 714a, 714b respectively, and can identify the condition triggering the alert. For example, as shown in FIG. 7A, the first icon 631a presents the condition of an engine having both an exhaust gas temperature (EGT) and an oil temperature alert, with the oil temperature alert requiring only that the engine thrust be reduced, but with the EGT alert indicating that the engine must be shut down. The second engine icon 631b indicates that a surge condition in the second engine requires that the engine thrust be reduced.

FIG. 7B illustrates the display 630 after the conditions of the engines have changed further. As indicated by the second icon 631b, the surge condition described above with reference to FIG. 7A has abated. Accordingly, the second condition message 635b is now blank, and the second outline 633b has reverted from the thick colored line shown in FIG. 7A to a thin white line.

As indicated by the first engine icon 631a, the first engine has failed. A fail field 744 provides a corresponding text message, and a fail icon 743 (e.g., an "X") replaces the fan icon 642 shown in FIG. 7A. As the condition of the engine falls below the idle level, the graphical start field 640 begins to change characteristics (e.g., so as to "unfill").

FIG. 7C illustrates the first engine icon 631a after the first engine has completely shut down. The graphical start field 640 is now completely unfilled, while the fail field 744 and the fail icon 743 indicate the state of an engine as having failed. The condition message field 635a indicates that the engine rotor is locked. Accordingly, the condition message field 635a can indicate to the operator whether or not an engine restart is possible or likely. In this particular case, a locked rotor is an indicator to the operator that in-flight restart is not possible.

Figure 8:
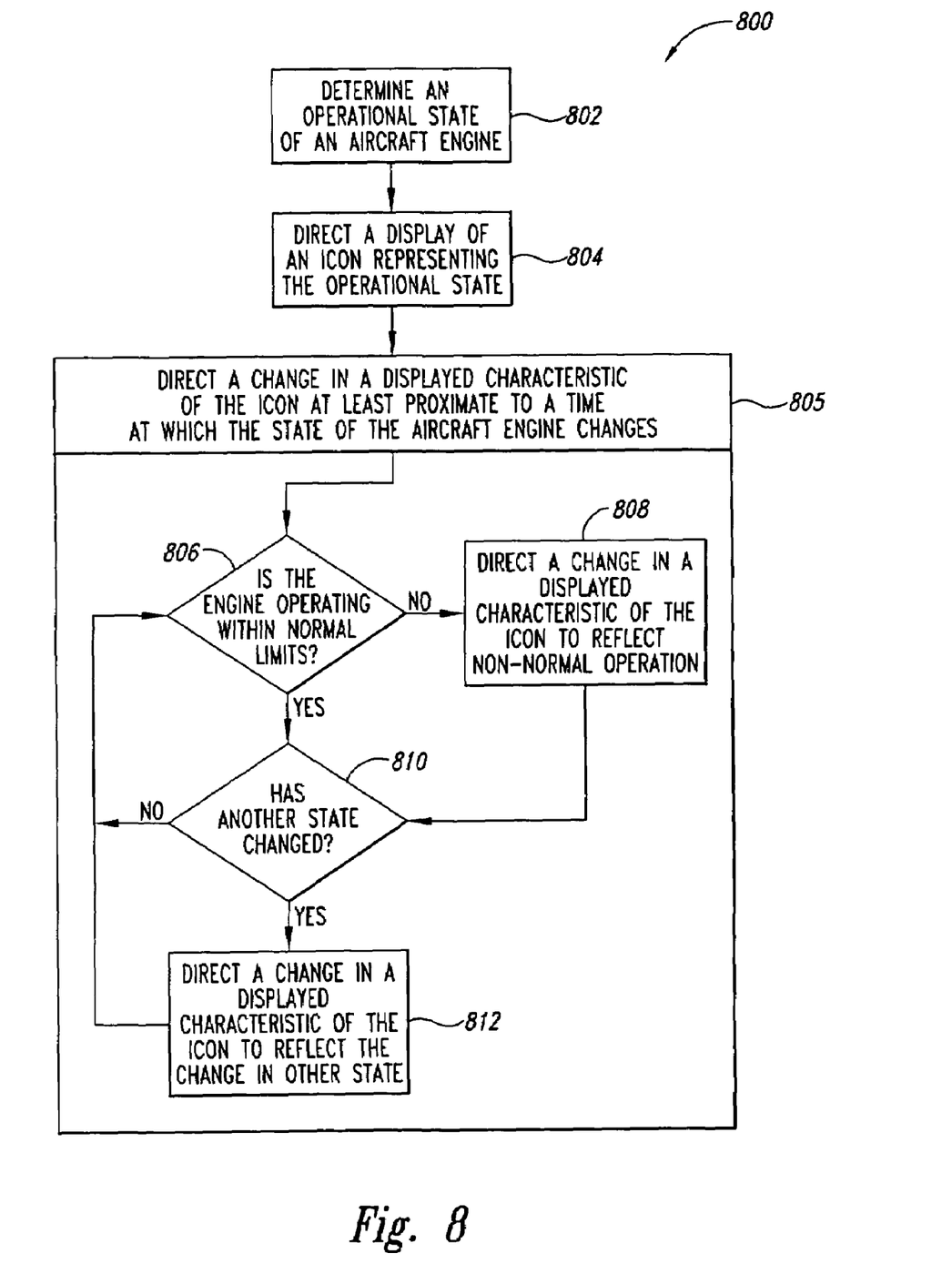
FIG. 8 is a flow chart illustrating a method for presenting aircraft engine states in accordance with an embodiment of the invention.

FIG. 8 is a flow chart illustrating a process 800 for displaying engine operating conditions in accordance with an embodiment of the invention. The process 800 can be carried out by components of the system 210 (FIG. 2) described above. For example, process portions that include making determinations can be carried out by one or more determining components of the system 210, and process portions that include directives for displays can be carried out by display and/or directive components. In process portion 802, the process 800 includes determining an operational state of an aircraft engine. The operational state can include a starting state, a running state, a shutdown state, or a fail state. The process 800 can further include directing a display of an icon representing the operational state (process portion 804). The icon can include, for example, any of the engine icons described above with reference to FIGS. 2–7C. In process portion 805, the process can include directing a change in a displayed characteristic of the icon at least proximate to a time at which the state of the aircraft engine changes. As described below, the change in state can be due to the engine shifting between operation within normal limits and operation outside normal limits, or the change in state can be due to other shifts (e.g., a shift between a started state and an unstarted state).

In a particular embodiment, process portion 805 can include process portions 806–812. In process portion 806, the process includes determining whether the engine is operating within normal limits. For example, if the engine is starting, the process can include determining whether the start is progressing normally or not. This determination can be made with reference to a state of an engine starter motor switch, and/or a fuel control switch. The process can include not only identifying the positions or states of the switches, but also whether, how, and/or at what rate these switches or other engine parameters have changed. For example, during a start, the process can include determining whether a core speed rate of change, an EGT rate of change, and/or a fuel flow rate of change are within acceptable limits. Whether or not the engine is operating within normal limits can be determined with reference to previously stored data (e.g., a look-up table). These normal limits can be different for other states, e.g., the running state, shut-down state, and failed state of the engine. Any change in state can be directed by the pilot or other operator, and/or by an engine control computer or FADEC, and/or by environmental conditions.

If the process determines that the engine is not operating within normal limits, then it directs a change in a displayed characteristic of the icon, e.g., to reflect non-normal operation (process portion 808). For example, process portion 808 can include changing a color, line thickness, display message, or other characteristic of the icon and/or related displayed information. If the engine is determined to be operating within normal limits, the process can further include determining whether another state of the engine has changed (process portion 810). Such a change can include, for example, a change from a started or running state to an unstarted state (or vice versa), or a change from a running state to a failed state. If the state has changed, the process can include directing a change in a displayed characteristic of the icon to reflect the change of state (process portion 812). In a particular aspect of this embodiment, the manner in which this change in state is displayed can be different than the manner in which state changes are displayed in process portion 808. For example, an engine icon depicting a fan can indicate a running engine, an "unfilled" engine icon can depict an unstarted engine, and an engine icon with an "X" can depict a failed engine. Whether or not the state has changed, the process can then return to process portion 806 to determine if the engine is operating within normal limits.

From the foregoing, it will be appreciated that specific embodiments of the invention have been described herein for purposes of illustration, but that various modifications may be made without deviating from the spirit and scope of the invention. For example, features described in the context of particular embodiments of the invention may be combined or eliminated in other embodiments. Method portions indicated to be in a particular order in some embodiments may be carried out in different orders in other embodiments. Accordingly, the invention is not limited except as by the appended claims.

We claim:

1. A computer-implemented method for displaying aircraft engine information, comprising:
   directing the display of an icon that represents an overall operational state of an aircraft engine, the overall operational state including one of a started state and an unstarted state;
   receiving a plurality of signals corresponding to a plurality of engine operating parameters while the engine is changing between the unstarted state and the started state;
   if all the engine operating parameters are within corresponding ranges, determining that the overall operational state of the aircraft engine is the started state;
   if fewer than all the engine operating parameters are within the corresponding ranges, determining that the overall operational state of the aircraft engine is the unstarted state; and
   directing a change in a displayed characteristic of the icon at least proximate to a time when the overall operational state of the aircraft engine changes from the one of the started state and the unstarted state to the other of the started state and the unstarted state.

2. The method of claim 1 wherein the one state is a first overall operational state, the other state is a second overall operational state, and directing a change in the characteristic of the icon includes directing a first change in the characteristic of the icon, and wherein the method further comprises directing a second change in a characteristic of the icon at least proximate to a time when the overall operational state of the aircraft engine changes to a third overall operational state.

3. The method of claim 1 wherein directing a change in a characteristic of an icon includes changing the icon to include a representation of a fan.

4. The method of claim 1 wherein directing the display includes directing the display of a representation of an engine inlet without a representation of a fan when the engine is in the unstarted state and with the representation of a fan when the engine is in the started state.

5. The method of claim 1, further comprising determining whether the engine is in the started state or the unstarted state based at least in part on a signal corresponding to engine rpm.

6. The method of claim 1, further comprising:
   when the engine is in the started state, displaying a fan icon representative of a fan; and
   when the engine has failed, ceasing to display the fan icon and instead displaying an icon representative of an X.

7. The method of claim 1, further comprising repeatedly directing changes in the display of the icon as the aircraft engine changes from the unstarted state to the started state.

8. The method of claim 1, further comprising determining the overall state of the aircraft engine from at least one engine operating parameter selected from engine rpm, thrust, engine pressure ratio, exhaust gas temperature, oil pressure, oil temperature, oil quantity, fuel flow, combuster burner pressure and vibration.

9. The method of claim 1, further comprising directing a display corresponding to operator instructions based at least in part on the overall operational state of the aircraft engine.

10. The method of claim 1 wherein the one state is a first overall operational state, the other state is a second overall operational state, and directing a change in the characteristic of the icon includes directing a first change in the characteristic of the icon, and wherein the method further comprises:
    directing a second change in the display of the icon at least proximate to a time when the overall operational state of the aircraft engine changes to a third overall operational state; and
    directing a display of a visual cue corresponding to an operator instruction when the overall operational state of the aircraft engine is the third overall operational state.

11. The method of claim 1, further comprising:
    receiving an indication as to whether the engine is operating normally or not;
    directing a display of a first visual cue when the engine is operating normally; and
    directing a display of a second visual cue different than the first visual cue when the engine is not operating normally.

12. The method of claim 1 wherein directing the display of an icon includes directing the display of a graphical icon representative of the aircraft engine.

13. The method of claim 1 wherein directing the display of an icon includes directing the display of an icon having a shape representative of the aircraft engine.

14. The method of claim 1, further comprising displaying a graphical representation of actual and available engine thrust in addition to the icon.

15. The method of claim 1 wherein the one state is a first overall operational state, the other state is a second overall operational state, and directing a change in the characteristic of the icon includes directing a first change in the characteristic of the icon, and wherein the method further comprises:
    directing a second change in a displayed characteristic of the icon when the overall operational state of the aircraft engine changes to a third overall operational state; and
    directing a third change in a displayed characteristic of the icon when the overall operational state of the aircraft engine changes to a fourth overall operational state;
    wherein the aircraft engine is not running when the overall operational state is the first overall operational state, and wherein the aircraft engine is operating within normal limits when the overall operational state is the second state, further wherein the aircraft engine is operating with a malfunction that requires a reduction in aircraft engine power when the overall operational state is the third overall operational state, still further wherein the aircraft engine is operating with a malfunction that requires the aircraft engine to be shut down when the overall operational state is the fourth overall operational state.

16. A computer-implemented method for displaying aircraft engine information, comprising:
directing the display of an icon that represents an unstarted state of an aircraft engine;
directing a display of an alphanumeric message indicating at least approximately how close the aircraft is to achieving the started state; and
as an overall operational state of the aircraft engine changes from the unstarted state to a started state, repeatedly directing changes in a displayed characteristic of the icon and in the display of the alphanumeric message.

17. The method of claim 16 wherein repeatedly directing changes in the display of the icon includes increasing an amount of a display field having a selected display characteristic as the aircraft engine changes from the unstarted state to the started state.

18. The method of claim 16 wherein repeatedly directing changes in the display of the icon includes increasing an amount of a display field having a selected color as the aircraft engine changes from the unstarted state to the started state.

19. The method of claim 16, further comprising repeatedly directing changes in the display of the icon as the overall operational state of the aircraft engine changes from the started state to the unstarted state.

20. A computer-implemented method for displaying aircraft engine information, comprising:
directing the display of an icon that represents an unstarted state of an aircraft engine, the icon representing an aircraft engine having an inlet;
as an overall operational state of the aircraft engine changes from the unstarted state to a started state, repeatedly directing first changes in a displayed characteristic of the icon, including increasing an amount of a display field having a selected color; and
when the aircraft engine achieves the started state, directing a second change in a displayed characteristic of the icon to indicate the started state, the second change including presenting a fan icon at the inlet portion of the engine icon.

21. The method of claim 20 further comprising:
directing a third change in the display of the icon when the aircraft engine is operating with a malfunction that requires a reduction in aircraft engine power; and
directing a fourth change in the display of the icon when the aircraft engine is operating with a malfunction that requires the aircraft engine to be shut down.

22. A computer-readable medium having contents that cause a computing device to display information corresponding to an overall operational state of an aircraft engine by performing a method, comprising:
directing the display of an icon that represents an overall operational state of an aircraft engine, the overall operational state including one of a started state and an unstarted state;
receiving a plurality of signals corresponding to a plurality of engine operating parameters while the engine is changing between the unstarted state and the started state;
if all the engine operating parameters are within corresponding ranges, determining that the overall operational state of the aircraft engine is the started state;
if fewer than all the engine operating parameters are within the corresponding ranges, determining that the overall operational state of the aircraft engine is the unstarted state; and
directing a change in a displayed characteristic of the icon at least proximate to a time when the overall operational state of the aircraft engine changes from the one of the started state and the unstarted state to the other of the started state and the unstarted state.

23. The computer-readable medium of claim 22 wherein the one state is a first overall operational state, the other state is a second overall operational state, and directing a change in the characteristic of the icon includes directing a first change in the characteristic of the icon, and wherein the method further comprises directing a second change in a characteristic of the icon at least proximate to a time when the overall operational state of the aircraft engine changes to a third overall operational state.

24. The computer-readable medium of claim 22 wherein directing the display includes directing the display of a representation of an engine inlet without a representation of a fan when the engine is in the unstarted state and with the representation of a fan when the engine is in the started state.

25. The computer-readable medium of claim 22, further comprising determining whether the engine is in the started state or the unstarted state based at least in part on a signal corresponding to engine rpm.

26. The computer-readable medium of claim 22, further comprising repeatedly directing changes in the display of the icon as the aircraft engine changes from the unstarted state to the started state.

27. The computer-readable medium of claim 22, further comprising:
directing a display of a first visual cue corresponding to an indication that the engine is operating normally when the engine is operating normally; and
directing a display of a second visual cue corresponding to an indication that the engine is not operating normally when the engine is not operating normally.

28. The computer-readable medium of claim 22 wherein the one state is a first overall operational state, the other state is a second overall operational state, and directing a change in the characteristic of the icon includes directing a first change in the characteristic of the icon, and wherein the method further comprises:
directing a second change in a displayed characteristic of the icon when the overall operational state of the aircraft engine changes to a third overall operational state; and
directing a third change in a displayed characteristic of the icon when the overall operational state of the aircraft engine changes to a fourth overall operational state;
wherein the aircraft engine is not running when the overall operational state is the first overall operational state, and wherein the aircraft engine is operating within normal limits when the overall operational state is the second state, further wherein the aircraft engine is operating with a malfunction that requires a reduction in aircraft engine power when the overall operational state is the third overall operational state, still further wherein the aircraft engine is operating with a malfunction that requires the aircraft engine to be shut down when the overall operational state is the fourth overall operational state.

29. A computer system for displaying information corresponding to the operation of an aircraft engine, comprising:

a determining component with contents capable of determining an overall operational state of the aircraft engine, the overall operational state including one of a started state and an unstarted state, the determining component further being capable of:
  receiving a plurality of signals corresponding to a plurality of engine operating parameters while the engine is changing between the unstarted state and the started state;
  if all the engine operating parameters are within corresponding ranges, determining that the overall operational state of the aircraft engine is the started state; and
  if fewer than all the engine operating parameters are within the corresponding ranges, determining that the overall operational state of the aircraft engine is the unstarted state; and
a display component with contents capable of displaying an icon indicating the overall operational state of the aircraft engine, the display component further being capable of directing a change in a displayed characteristic of the icon at least proximate to a time when the overall operational state of the aircraft engine changes from the one of the started state and the unstarted state to the other of the started state and the unstarted state.

30. The system of claim 29 wherein the display component is capable of directing the display of a representation of an engine inlet without a representation of a fan when the engine is in the unstarted state and with the representation of a fan when the engine is in the started state.

31. The system of claim 29, wherein the display component is capable of repeatedly directing changes in the display of the icon as the aircraft engine changes from the unstarted state to the started state.

32. The system of claim 29 wherein the display component is capable of:
  directing a display of a first visual cue corresponding to an indication that the engine is operating normally when the engine is operating normally; and
  directing a display of a second visual cue corresponding to an indication that the engine is not operating normally when the engine is not operating normally.

33. A computer system for displaying information corresponding to the operation of an aircraft engine, comprising:
  determining means for determining an overall operational state of the aircraft engine, the overall operational state including one of a started state and an unstarted state, the determining means being capable of:
    receiving a plurality of signals corresponding to a plurality of engine operating parameters while the engine is changing between the unstarted state and the started state;
    if all the engine operating parameters are within corresponding ranges, determining that the overall operational state of the aircraft engine is the started state; and
    if fewer than all the engine operating parameters are within the corresponding ranges, determining that the overall operational state of the aircraft engine is the unstarted state; and
  display means for displaying an icon indicating the overall operational state of the aircraft engine, the display means further being capable of directing a change in a displayed characteristic of the icon at least proximate to a time when the overall operational state of the aircraft engine changes from the one of the started state and the unstarted state to the other of the started state and the unstarted state.

34. The system of claim 33 wherein the display means is capable of directing the display of a representation of an engine inlet without a representation of a fan when the engine is in the unstarted state and with the representation of a fan when the engine is in the started state.

35. The system of claim 33, wherein the display means is capable of repeatedly directing changes in the display of the icon as the aircraft engine changes from the unstarted state to the started state.

36. The system of claim 33 wherein the display means is capable of:
  directing a display of a first visual cue corresponding to an indication that the engine is operating normally when the engine is operating normally; and
  directing a display of a second visual cue corresponding to an indication that the engine is not operating normally when the engine is not operating normally.

37. A computer-readable medium containing a data structure having information for display, the information when displayed including an icon that indicates a qualitative overall operating state of the aircraft engine, wherein:
  the qualitative overall operational state includes one of a started state and an unstarted state;
  the icon has a characteristic that changes when the overall operational state of the aircraft engine changes from the one of the started state and the unstarted state to the other of the started state and the unstarted state; and
  the computer readable medium is configured to:
    receive a plurality of signals corresponding to a plurality of engine operating parameters while the engine is changing between the unstarted state and the started state;
    if all the engine operating parameters are within corresponding ranges, determine that the overall operational state of the aircraft engine is the started state; and
    if fewer than all the engine operating parameters are within the corresponding ranges, determine that the overall operational state of the aircraft engine is the unstarted state.

38. The computer-readable medium of claim 37 wherein the icon includes a representation of an engine inlet without a representation of a fan when the engine is in the unstarted state and with the representation of a fan when the engine is in the started state.

39. The computer-readable medium of claim 37, wherein a characteristic of the icon changes repeatedly as the aircraft engine changes from the unstarted state to the started state.

40. A computer-implemented method for displaying aircraft engine information, comprising:
  directing the display of an icon that represents an overall operational state of an aircraft engine, the overall operational state including one of a started state and an unstarted state; and
  directing a change in a displayed characteristic of the icon at least proximate to a time when the overall operational state of the aircraft engine changes from the one of the started state and the unstarted state to the other of the started state and the unstarted state, wherein directing the display includes directing the display of a representation of an engine inlet without a representation of a fan when the engine is in the unstarted state and with the representation of a fan when the engine is in the started state.

41. A computer-implemented method for displaying aircraft engine information, comprising:

directing the display of an icon that represents an overall operational state of an aircraft engine, the overall operational state including one of a started state and an unstarted state;

directing a change in a displayed characteristic of the icon at least proximate to a time when the overall operational state of the aircraft engine changes from the one of the started state and the unstarted state to the other of the started state and the unstarted state;

when the engine is in the started state, displaying a fan icon representative of a fan; and when the engine has failed, ceasing to display the fan icon and instead displaying an icon representative of an X.

* * * * *